L. E. WATERMAN.
BEAM CONNECTION FOR CULTIVATORS.
APPLICATION FILED MAR. 14, 1917.
1,285,506.                                    Patented Nov. 19, 1918.
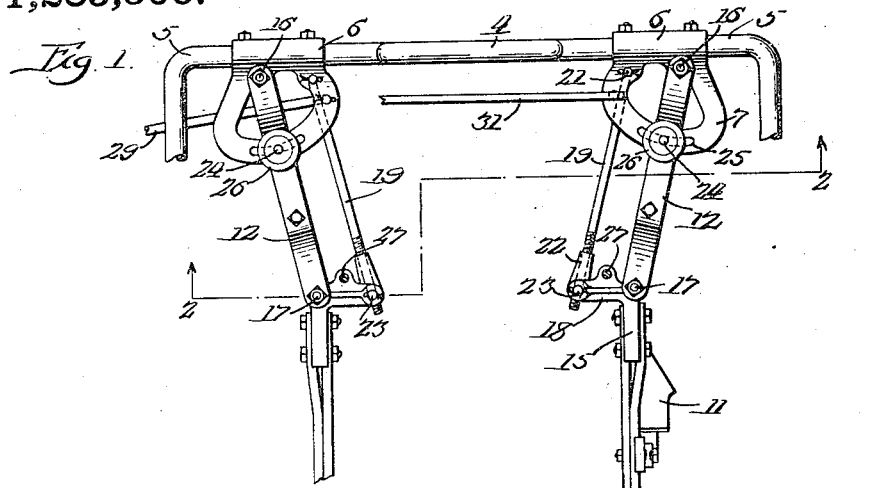
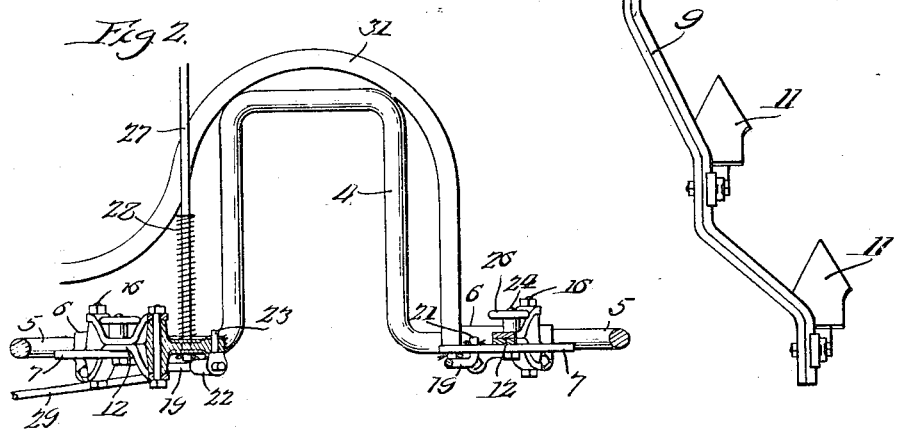
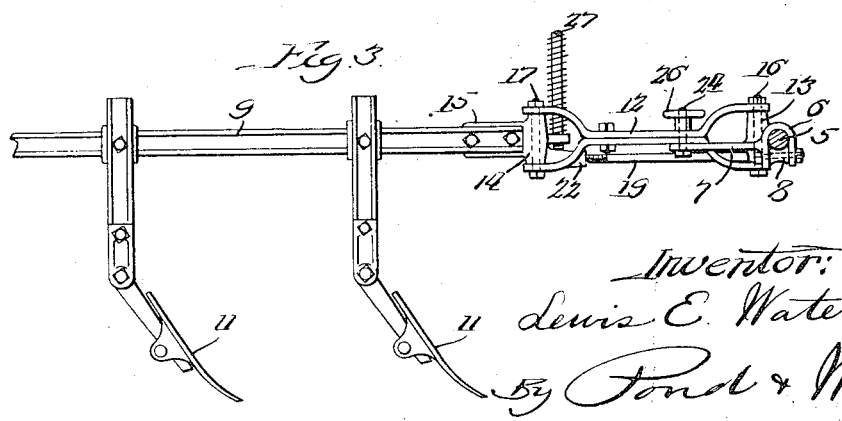
Inventor:
Lewis E. Waterman
by Pond & Wilson
Attys.

UNITED STATES PATENT OFFICE.

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

BEAM CONNECTION FOR CULTIVATORS.

1,285,506.     Specification of Letters Patent.      Patented Nov. 19, 1918.

Application filed March 14, 1917. Serial No. 154,770.

*To all whom it may concern:*

Be it known that I, LEWIS E. WATERMAN, a citizen of the United States, residing at Rockford, in the county of Winnebago and State of Illinois, have invented certain new and useful Improvements in Beam Connections for Cultivators, of which the following is a specification.

This invention relates to the connection of tool-carrying beams to a frame or to a part connected therewith, and has more particular reference to that class of tool-carrying beams in which the beam is pivotally connected at its forward end and is adapted to carry various types of cultivating tools variously arranged on the beam so that the tools may be moved into and out of the ground by swinging the beam vertically on its forward pivot.

In the present invention, I have aimed, primarily, to provide improved means for connecting a tool-carrying means of this type to a frame or supporting part, which will allow the tool-carrying means to be adjusted laterally with respect to the part on which it is mounted in a parallel movement and then to be locked in such adjusted position against lateral displacement. In other words, the tool-carrying means is moved bodily in a lateral direction and uniformly at its forward and rear ends so that the cultivating tools at such ends will be correspondingly adjusted laterally and will always be maintained in a given angular relation to a row of plants being cultivated regardless of whether the beam is set for close or coarse cultivation. My improvements are especially desirable in connection with cultivators having beams mounted so as to be slidable laterally and having hand levers or other means for adjusting and controlling such movement, and when so embodied, will permit of lateral parallel-movement adjustment of the beams independently of the means for sliding the beams laterally on their mountings.

I have also provided an improved beam connection designed to enable quick, independent lateral adjustment of cultivating beams and constructed so simply that it may be manufactured at a comparatively low cost.

Other objects and attendant advantages will be appreciated by those skilled in the art as the invention becomes better understood by reference to the following description when considered in connection with the accompanying drawings, in which—

Figure 1 is a plan view of a pair of cultivator beams connected to a bail or arch of a cultivator by means embodying my improvements;

Fig. 2 is a transverse vertical sectional view taken substantially on the line 2—2 of Fig. 1; and Fig. 3 is a side elevation of one of the beams and its connection, taken from the right hand side of Fig. 1.

While I have illustrated in the drawings my improvements connected to a bail or arch, such as is employed in some types of cultivators, it should be understood that my improved beam connection is generally applicable in various types.

The bail or arch designated generally by reference character 4 is shaped to provide horizontal portions 5 upon which the beam mountings are adapted to slide laterally, that is, horizontally, transversely with respect to the line of draft or to the longitudinal medial line of the cultivator. Since each beam connection is of similar construction, a description of but one connection will suffice. A bracket 6 having formed integrally therewith a sector 7 is slidably mounted on a bail portion 5 and is equipped, as shown in Fig. 3, with rollers 8 engaging the underside of said bail portion for the purpose of holding the bracket in free sliding connection therewith. The cultivator beam 9 may be of suitable construction as it is well known in the art to provide cultivator beams of various shapes adapted to carry different kinds of cultivating tools in different arrangements according to the type of cultivation to be performed, and in the present instance, the beam is equipped with shovels 11.

My improvements have reference to the connection between the tool-carrying beam and a part connected with the frame, such for instance as the bracket 6 or to the frame proper of the cultivator, and in the present instance I have illustrated them as consisting, generally stated, of a connection including a pair of substantially parallel links mounted on vertical axes and arranged so that by swinging the links laterally they will move the beam laterally in a substantially parallel movement so that the relative relation of the shovels to the medial line of the cultivator is not changed in any of the adjusted positions of the beam. The connection also includes an adjustment whereby the beam may be angled with respect to the longitudinal medial line of the cultivator and when so angled will be maintained in such position during the lateral parallel movement effected through the medium of the laterally swinging links. Means is also provided for locking the links in set position against lateral swinging movement so as to maintain the beam in a fixed working position. One of the parallel links designated generally by reference character 12 is of heavier construction than the other as it is adapted to directly support and carry the beam, and for this purpose it has relatively long upright pivotal connections with the bracket 6 and with the beam, respectively. A substantial pivotal connection may be formed at each end of the link 12 by forking the ends thereof so that they will embrace the posts 13 and 14 respectively, formed integrally with the bracket 6 and a bracket 15 bolted to the forward end of the cultivator beam. Pivot bolts 16 and 17 are passed respectively through the posts 13 and 14 and the coöperating forked ends of the link 12 so as to pivotally connect these parts together on upright axes in the manner plainly shown in the drawings. The bracket 15 to which the forward end of the cultivator is attached is provided with a lateral extension or arm 18, and a link 19 substantially parallel with the link 12 establishes a pivotal connection between the outer end of the arm 18 and the bracket 6. A simple way of forming the forward pivot of this connection is by turning the forward end of the link 19 upwardly as at 21 and passing it through an aperture in the bracket 6 and securing the end 21 from displacement by suitable means such as a cotter pin. It is desired to obtain adjustment between the forward and rear pivots of the link 19 so that the beam 9 may be rocked on its pivot 19 for the purpose of setting the beam in angular relation to the medial line of the cultivator or in parallel relation thereto, as the case may be, and for this purpose the rear end of the link 19 may be threadingly engaged in a collar 22 which is provided with an upstanding pivot pin 23 passing through an aperture in the end of the arm 18 and held against displacement therefrom by suitable means, such as a cotter pin, as shown. A substantially parallelogram structure is thus formed so that upon swinging the links laterally on the pivots 16 and 21 the beam 9 will be moved laterally in a substantially parallel movement. If it should be desired to change the relation of the beam with respect to the medial line of the cultivator, that is, to angle the beam with respect thereto, the link 19 would be adjusted longitudinally in the collar 22, thereby increasing or decreasing, as the case may be, the distance between the pivots 21 and 23 so as to set the beam at the desired angular position. When the links are now swung sidewise the beam will be correspondingly swung sidewise in a parallel movement in which the beam is maintained at the desired angular relation to the medial line of the cultivator. Means is provided for limiting the sidewise or lateral swinging movement of the cultivator beam and for locking it in any set position within the limits of this movement. This means consists of a bolt 24 passing through an aperture in the link 12 and through an arcuate slot 25 in the sector 7 and an adjusting nut 26 screwed onto the bolt for rigidly clamping the link 12 to the sector 7. It will be obvious that the links 12 and 19, and consequently the beam 9, may be swung laterally within the limits defined by the ends of the slot 25 and may be locked in set position at any point between these limits. Means is also provided for limiting the working depth of the shovels and for raising and lowering the same about the pivot of the bracket 6 on the arch portion 5. This means forms no part of the present invention and hence is but partially illustrated, and consists of a link 27 slidably connected with the beam through the intermediary of the arm 18 of the beam bracket and equipped with an expansion spring 28, as shown, which permits the beam to yieldingly move upwardly with respect to the link 27. Suitable means such as an adjustable hand lever (not shown) may be mounted on the frame of the cultivator and connected to the link 27 for raising and lowering the beam.

In the present application of my improvements the brackets 6 upon which the beams are mounted are themselves slidable transversely of the cultivator on the portions 5 of the arch member for the purpose of bodily moving the beam transversely and means (not shown) is provided for controlling this transverse movement of the brackets. An arch structure and beam mounting of this particular character and mechanism for moving the beams laterally on the horizontal portions of the arches are shown in my copending application Ser. No. 61,622 filed Nov. 15, 1915. In the present application I have only shown links 29 and 31 connected respectively to the brackets 6 of the left and right hand cultivator beams, these links being adapted to be actuated by mechanism for moving the brackets laterally of the cultivator on the portions 5 of the arch and for holding the brackets in fixed relation to the arch in any adjusted position. The lateral movement of the beams permitted by sliding them on their pivotal mountings, such as on the arch portions 5, does not, however, give a sufficient range of lateral adjustment necessary for all purposes, so that by means of the parallel-movement connections the beams may be adjusted laterally throughout a wide range of movement which serves for all conditions of usage. Moreover, this lateral adjustment is effected in a very simple manner and the beams when swung laterally are automatically maintained in the proper relation to the line of draft, although this relation may be varied as described above by adjustment of the distances between the pivots 21 and 23 of the link 19.

It should be understood while I have illustrated but one practical embodiment of my improvements, various changes in the construction and arrangement of parts might be resorted to without departing from the spirit and scope of the invention as expressed in the appended claims.

I claim:

1. The combination of a support, a pair of laterally spaced links pivotally connected at their forward ends to said support at laterally spaced points so that the rear ends of the links may be swung laterally about their forward pivots, a tool-carrying beam pivotally attached at its forward end to one of said links, a pivotal connection between the other link and the beam whereby upon swinging the links laterally the beam will be carried laterally in a parallel movement, and a device for locking the links against lateral swinging movement about their forward pivots.

2. In a cultivator, the combination of an arch structure having laterally spaced horizontal supporting arms, a bracket mounted to slide laterally on each arm, a cultivator beam for each bracket, a pair of substantially parallel laterally spaced links pivotally connected at their forward and rear ends to each bracket and its cultivator beam respectively, whereby upon lateral swinging movement of each pair of links about its forward pivots, its cultivator beam will be carried laterally in a parallel movement, a device for locking the links against such lateral swinging movement with respect to the brackets, and connections for adjusting the brackets laterally on said horizontal arms.

3. The combination of a support, a bracket laterally adjustable thereon, a tool-carrying beam, a pair of substantially parallel laterally spaced links pivotally connected at their forward and rear ends to said bracket and tool-carrying beam respectively so that the links may swing laterally about their forward pivots and thereby carry the tool-carrying beams laterally in a parallel movement, whereby the tool-carrying beam will be held fixed to the bracket as regards lateral movement relatively thereto and will be moved laterally with the bracket when the latter is so adjusted.

4. In a cultivator, the combination of a frame structure, a cultivator beam, means for pivotally attaching the cultivator beam at its forward end to the frame structure so that the beam may be swung laterally upon said supporting means in a parallel movement, said means comprising a pair of laterally spaced parallel members pivotally connected at their forward and rear ends to the frame structure and the cultivator beam, and a connection between one of said members and the frame structure including a clamping member for securing said member fixedly to the frame structure at any laterally adjusted position of said member with respect to the frame structure.

LEWIS E. WATERMAN.

Copies of this patent may be obtained for five cents each, by addressing the "Commissioner of Patents, Washington, D. C."